(12) United States Patent  
Honda et al.

(10) Patent No.: US 6,890,374 B2  
(45) Date of Patent: May 10, 2005

(54) FILTER FOR SAMPLING CHLORINATED ORGANIC COMPOUND

(75) Inventors: Katsuhisa Honda, Matsuyama (JP); Muneki Ohuchi, Matsuyama (JP); Masazumi Yamashita, Matsuyama (JP); Hirofumi Nakamura, Matsuyama (JP); Osamu Kajikawa, deceased, late of Kobe (JP); by Toshiko Kajikawa, legal representative, Kobe (JP); Takatomo Fujii, Osaka (JP)

(73) Assignees: Miura Co., Ltd., Matsuyama (JP); Osaka Gas Co., Ltd., Osaka (JP)

( * ) Notice: Subject to any disclaimer, the term of this patent is extended or adjusted under 35 U.S.C. 154(b) by 0 days.

(21) Appl. No.: 10/048,526
(22) PCT Filed: May 28, 2001
(86) PCT No.: PCT/JP01/04470

§ 371 (c)(1),
(2), (4) Date: Jul. 22, 2002

(87) PCT Pub. No.: WO01/91883

PCT Pub. Date: Dec. 6, 2001

(65) Prior Publication Data

US 2003/0000189 A1 Jan. 2, 2003

(30) Foreign Application Priority Data

May 31, 2000 (JP) ........................................ 2000-163115

(51) Int. Cl.[7] .......................... B01D 46/00; B01D 39/20
(52) U.S. Cl. ............................ 95/142; 96/413; 55/527; 210/508; 422/88; 73/863.23; 502/415
(58) Field of Search .......................... 55/524, 527, 528; 95/142; 96/413; 210/502.1, 503, 505, 506, 508, 908; 422/83, 88; 436/178; 73/863.23; 502/415, 417, 439; 264/122, DIG. 48

(56) References Cited

U.S. PATENT DOCUMENTS

| | | | |
|---|---|---|---|
| 4,968,467 A | * 11/1990 | Zievers | 264/216 |
| 5,057,482 A | * 10/1991 | Fukuda et al. | 502/303 |
| 5,106,395 A | 4/1992 | Weber et al. | |
| 5,237,881 A | * 8/1993 | Ross | 73/863.12 |
| 5,824,919 A | * 10/1998 | Hansen | 73/863.23 |
| 5,876,537 A | * 3/1999 | Hill et al. | 156/89.11 |
| 6,555,385 B1 | * 4/2003 | Honda et al. | 436/178 |

FOREIGN PATENT DOCUMENTS

| | | |
|---|---|---|
| EP | 402 972 | 12/1990 |
| EP | 470659 A1 | 7/1991 |
| EP | 470 659 A1 | 2/1992 |

(Continued)

OTHER PUBLICATIONS

JIS K 0311:1999 Investigated by Japanese Industrial Standards Committee, Published by Japanese Standards Association, Established Sep. 20, 1999, cited at p.: 3 of the present specification.

(Continued)

Primary Examiner—Frank M. Lawrence
(74) Attorney, Agent, or Firm—Birch, Stewart, Kolasch & Birch, LLP

(57) ABSTRACT

A collector 3 capable of collecting and sampling simultaneously various types of chlorinated organic compounds in both particulate and gaseous forms contained in a fluid and easy to extract the sampled chlorinated organic compounds therefrom includes a sampling filter 7 installed in a holder 6 having a discharge route 12a. The sampling filter 7 contains fibers and an inorganic binder for binding the fibers to one another and has a fluid-permeability. Various types of the chlorinated organic compounds such as dioxins and coplanar PCBs in both particulate and gaseous forms contained in a sample gas flowing into the holder 6 from a flue duct 25 through a sampling pipe 2 and an introduction pipe 8 are collected and sampled while the sample gas being passed through the sampling filter 7 and the resulting sample gas from which the chlorinated organic compounds are removed is then discharged out to the outside through the discharge route 12a.

6 Claims, 5 Drawing Sheets

FOREIGN PATENT DOCUMENTS

| | | |
|---|---|---|
| EP | 0 971 223 A1 | 1/1999 |
| JP | 55-62299 A | 5/1980 |
| JP | 3-26310 | 2/1991 |
| JP | 4-260407 A | 9/1992 |
| JP | 4-260407 | 9/1992 |
| JP | 5-154345 | 6/1993 |
| JP | 8-6236 B | 1/1996 |
| JP | 8-6236 | 1/1996 |
| JP | 8-164378 A | 6/1996 |
| JP | 2000-35386 A | 2/2000 |
| JP | 2000-61224 | 2/2000 |
| WO | WO99/37987 | 7/1999 |
| WO | 99/64135 A1 | 12/1999 |
| WO | WO99/64135 | 12/1999 |

OTHER PUBLICATIONS

"Method 23" formulated by the U.S. Environmental Protection Agency (EPA), Title 40, Part 60 of the Code of Federal Regulations, pp. 8–42, cited at p. 4 of the present specification.

British standard "Stationary Source Emissions–Determination of the Mass Concentration of PCDDs/PCDFs" Part 1 Sampling.

British standard "Stationary Source Emissions–Determination of the Mass Concentration of PCDDs/PCDFs" Part 2 Extraction and Clean–up.

British standard "Stationary Source Emissions–Determination of the Mass Concentration of PCDDs/PCDFs" Part 3 Identification and Quantification.

* cited by examiner

FILTER FOR SAMPLING CHLORINATED ORGANIC COMPOUND

This application is the national phase under 35 U.S.C. § 371 of PCT International Application No. PCT/JP01/04470 which has an International filing date of May 28, 2001, which designated the United States of America.

FIELD OF THE INVENTION

The present invention relates to a sampling filter for chlorinated organic compounds, especially a filter for removing chlorinated organic compounds contained in a fluid from the fluid and sampling them.

BACKGROUND ART

A waste gas generated from incineration facilities for incinerating wastes such as industrial wastes and domestic refuse contains various types of chlorinated organic compound such as dioxins, coplanar PCBs, and further polychlorobiphenyl, chlorophenol and chlorobenzene.

Here, the word, dioxins, is a general term of polychlorodibenzo-p-dioxins (PCDDs), polychlorodibenzofuran (PCDFs), and the like and as known well, they are extremely toxic environmental pollutants and especially tetrachlorodibenzodioxins ($T_4CDDs$) among them is known as the most intensely toxic environmental pollutant. Further, polychlorobiphenyls are also strongly toxic environmental pollutants and coplanar PCBs among them is recognized similarly as the most intensely toxic environmental pollutant. On the other hand, although chlorinated organic compounds such as chlorophenol, chlorobenzene and the like are less toxic than dioxins, they are recognized as environmental pollutants just like dioxins since they are found easy to be converted into dioxins using various element contained in fly ashes as catalyst in, for example, an incinerator in a temperature range of the waste gas. For that, in terms of the environmental preservation, it becomes an urgent issue to establish a countermeasure for removing such various chlorinated organic compounds as described above from a fluid such as a waste gas and wastewater and at the same time it is also urgent to establish a technique of analysis of such chlorinated organic compounds contained in a fluid in global scale.

At the time of analyzing chlorinated organic compounds contained in a fluid, at first, a sample has to be taken precisely and accurately from a fluid to be an object for the analysis. For example, in the case of analysis of chlorinated organic compounds contained in a waste gas, a prescribed amount of a sample gas is sampled from a space containing the waste gas, for example, a flue duct, to pass the waste gas through. Various chlorinated organic compounds contained in the sample gas are required to be reliably collected without leakage. Especially, since dioxins and coplanar PCBs, environmental pollutants as described above, are contained in extremely slight amounts in the sample gas, and regardless of the existing form, such as particulate form or gaseous form, the types of pollutants vary widely, failing precise sampling. Thus, highly reliable analysis results cannot be expected. Further, the above-described coplanar PCBs is contained in a large amount in the atmospheric air, and if the sample gas is contaminated with such coplanar PCBs, highly reliable analysis results is not expected. For that, in order to guarantee the accuracy of the analysis results, Japan, US, and each country of Europe, respectively, have been officially regulating the sampling methods of samples necessary to analyze the chlorinated organic compounds such as dioxins and coplanar PCBs contained in, for example, a waste gas.

For example, the Japanese Industrial Standards JIS K 0311: 1999 formulated on Sep. 20, 1999 regulates, "A measurement method of dioxins and coplanar PCBs in waste gas" and practically exemplifies a sampling apparatus of a sample gas containing chlorinated organic compounds such as dioxins. The sampling apparatus is provided with a sampling tube for sampling a sample gas from a flue duct in which a waste gas of an incinerator flows through, a first collector equipped with a filter unit for sampling the chlorinated organic compounds mainly in a particulate form contained in the gas sampled in the sampling tube, and a second collector for sampling the chlorinated organic compounds in a gaseous form difficult to be sampled by the first collector. In this case, the second collector is provided with mainly a liquid collecting section composed of a plurality of impingers made of glass and filled with an absorption liquid and an adsorptive collecting section containing an adsorbent (e.g. XAD-2) so as to collect the chlorinated organic compounds in the gaseous state, which are not collected by the first collector, by the absorption liquid and the adsorbent.

Such a sampling apparatus has a complicated constitution comprising the first collector and the second collector and is costly owing to the use of many appliances made of glass, so that in many cases, the apparatus is used repeatedly. In such a case, since it is required to keep the respective members such as impingers clean in order to retain the reliability of the measurement data, the preparatory operation such as a washing work and the like to be carried out before sampling of a sample gas becomes extremely complicated. Further, at the time of sampling the gaseous chlorinated organic compounds contained in the sample gas by the second collector, the second collector is required to be cooled by a cooling material such as dry ice and the sample-sampling operation itself becomes extremely complicated, too. Further, after the sampling of the sample gas, the chlorinated organic compounds collected by the first collector and the second collector are needed to be extracted and in this case, the chlorinated organic compounds separately collected by the first collector and the second collector are needed to be extracted separately. Therefore, the extraction operation itself becomes complicated and takes a long time to finish and further the reliability of the analysis results is, in many cases, affected by the skills of the extraction operation. Further, the sampling apparatus comprises two types of collectors, the first collector and the second collector, so that the apparatus is inevitably enlarged, and also glass appliances are used a lot, therefore the apparatus is easy to be broken to make handling and transportation difficult at the time of sampling the sample gas.

On the other hand, the Environment Preservation Agency (EPA) of the U.S. and the Comite de Europeen Normalisation (CEN) have determined official methods independently, and the sampling apparatuses described therein are not so much different from the Japanese one described above in terms of the complication of the constitution and the difficulty of handling, although there exist minor detailed differences.

The object of the present invention is to simultaneously collect and sample various kinds of chlorinated organic compounds in both particulate form and gaseous form and easily extract the sampled chlorinated organic compounds.

DISCLOSURE OF THE INVENTION

A sampling filter for chlorinated organic compounds according to the present invention is for removing chlorinated organic compounds contained in a fluid from the fluid and sampling them, and comprises a fluid-permeable molded body containing fibers and an inorganic binder for binding the fibers to one another. In this case, the molded body has a bulk density of, for example, 0.1 to 1 g/cm$^3$. Further, the fibers are of at least one kind of fibers selected from a group consisting of fibrous activated carbon, carbon fiber, glass fiber, alumina fiber, silica fiber and Teflon fiber. The inorganic binder has an adsorbing capability to, for example, chlorinated organic compounds. In this case, the inorganic binder is of at least one kind of compounds selected from a group consisting of alumina, zeolite and silicon dioxide.

In one embodiment of a sampling filter for the chlorinated organic compounds according to the invention, the above-described fibers are activated alumina fibers and the above-described inorganic binder is a granular activated alumina. In this case, the bulk density of the above-described molded body is, for example, 0.3 to 0.7 g/cm$^3$.

Since the sampling filter of the invention is of a fluid-permeable molded body, a fluid containing various types of chlorinated organic compounds such as dioxins and coplanar PCBs in both particulate form and gaseous form can be passed through. At that time, the various types of chlorinated organic compounds in both forms are collected simultaneously by the fibers and the inorganic binder contained in the molded body to be separated from the fluid. That is, various types of the chlorinated organic compounds in both particulate and gaseous forms contained in the fluid are sampled by the molded body. The sampled chlorinated organic compounds are extracted by a variety of extraction operations for the resulting molded body.

The production method of the present invention is a method for producing a filter for removing chlorinated organic compounds contained in a fluid from the fluid and sampling them, and comprises steps of producing a molding material containing fibers and an inorganic binder for binding the fibers to one another and molding the molding material into a prescribed shape and then sintering the molded material. The production method further comprises, a step of, for example, immersing the obtained molded body in an aqueous dispersion of an inorganic binder and then drying it.

In the production method, since the molding material is sintered after being molded as described above, a molded body having a fluid-permeability can be produced. Since the molded body contains the fibers and the inorganic binder, when a fluid containing various types of chlorinated organic compounds such as dioxins and coplanar PCBs in both particulate and gaseous forms passes through, the molded body can collect simultaneously various types of chlorinated organic compounds in both forms to remove them from the fluid.

A collector of the chlorinated organic compounds according to the present invention is for collecting the chlorinated organic compounds contained in a fluid flowing in a transportation pipe, and comprises a filter of a fluid-permeable molded body and a container for housing the filter and having a discharge outlet for discharging the fluid passed through the filter to the outside. The filter contains fibers and an inorganic binder for binding the fibers to one another. The filter has, for example, a cylindrical shape with an opening part to insert the transportation pipe into in one side and closed in the other side.

In the collector, the fluid from the transportation pipe is discharged through the discharge outlet to the outside after being passed through the filter in the container. At that time, various types of the chlorinated organic compounds such as dioxins and coplanar PCBs in both particulate and gaseous forms contained in the fluid are simultaneously collected by the fibers and the inorganic binder, separated from the fluid and sampled by the filter. The various types of the chlorinated organic compounds sampled by the filter are extracted by a variety of extraction operations for the filter.

A sampling method of chlorinated organic compounds according to the present invention is a method for sampling chlorinated organic compounds contained in a fluid flowing in a transportation pipe, and comprises a step of passing a fluid from the transportation pipe through a filter of a fluid-permeable molded body containing fibers and an inorganic binder for binding the fibers to one another.

Since the sampling method is carried out using said filter of the fluid-permeable molded body containing the fibers and the inorganic binder for binding the fibers to one another, when the fluid from the transportation pipe passes through the filter, the various types of the chlorinated organic compounds such as dioxins and coplanar PCBs in both particulate and gaseous forms contained in the fluid are simultaneously collected and sampled by the filter. The various types of the chlorinated organic compounds sampled by the filter are extracted by carrying out a variety of extraction operations for the filter.

Other objects and effects of the present invention will be made clear from the following detailed descriptions.

DETAILED DESCRIPTION OF THE INVENTION

Figure 1:
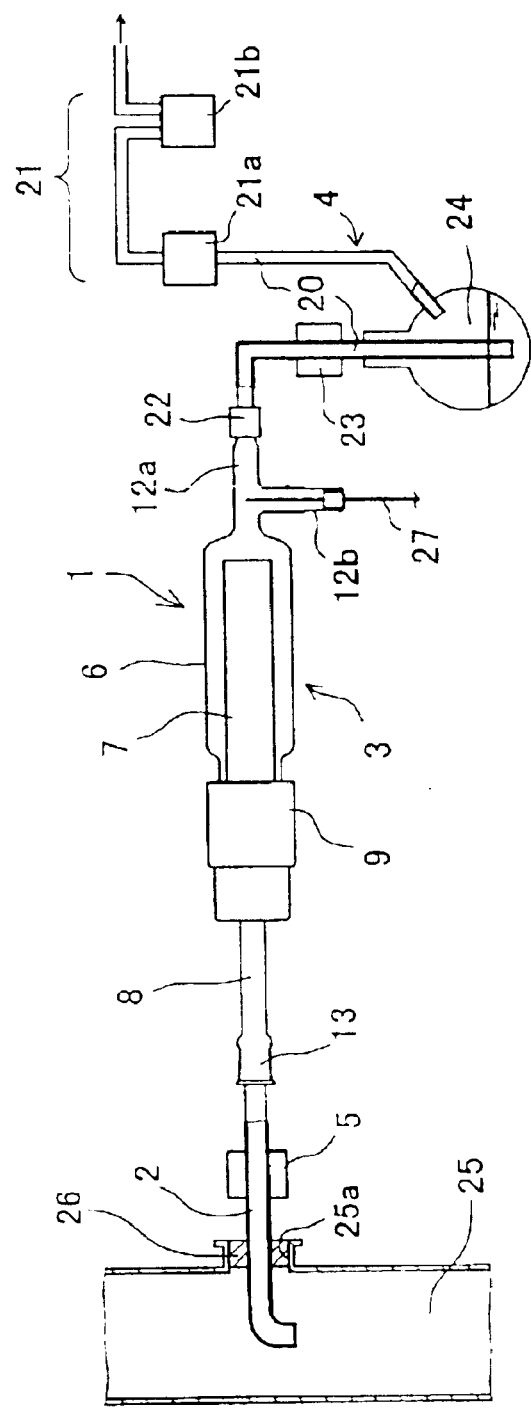
FIG. 1 is a schematic constitutional figure of a sampling apparatus of chlorinated organic compounds which employs a collector relevant to one embodiment of the invention.

A schematic constitution of a sampling apparatus for chlorinated organic compounds is shown in FIG. 1 which employs one embodiment of collectors of chlorinated organic compounds according to the invention. The sampling apparatus 1 is for sampling chlorinated organic compounds contained in a sample fluid such as a waste gas (a sample gas) among fluids. In the figure, the sampling apparatus 1 mainly comprises a sampling pipe 2, a collector 3 (one embodiment of collectors according to the invention), and an aspirator 4.

The sampling pipe 2 is a pipe made of, for example, borosilicate glass or transparent quartz glass and having a cooling apparatus 5 for cooling the sample gas flowing therein.

Figure 2:
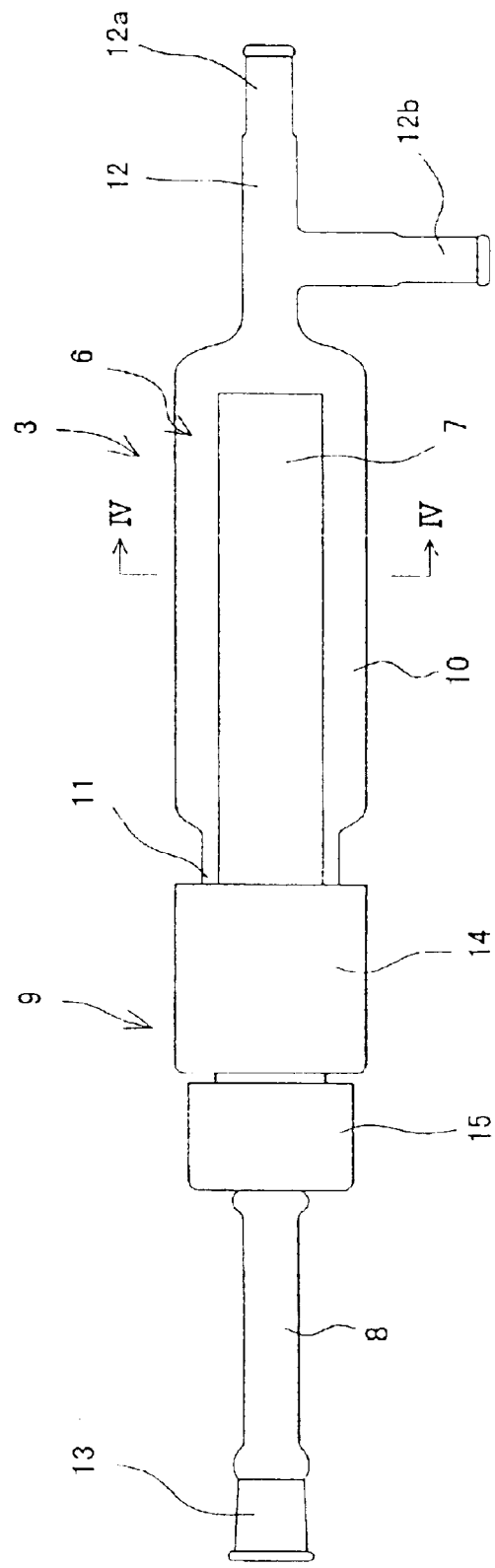
FIG. 2 is a front view of the collector.
Figure 3:
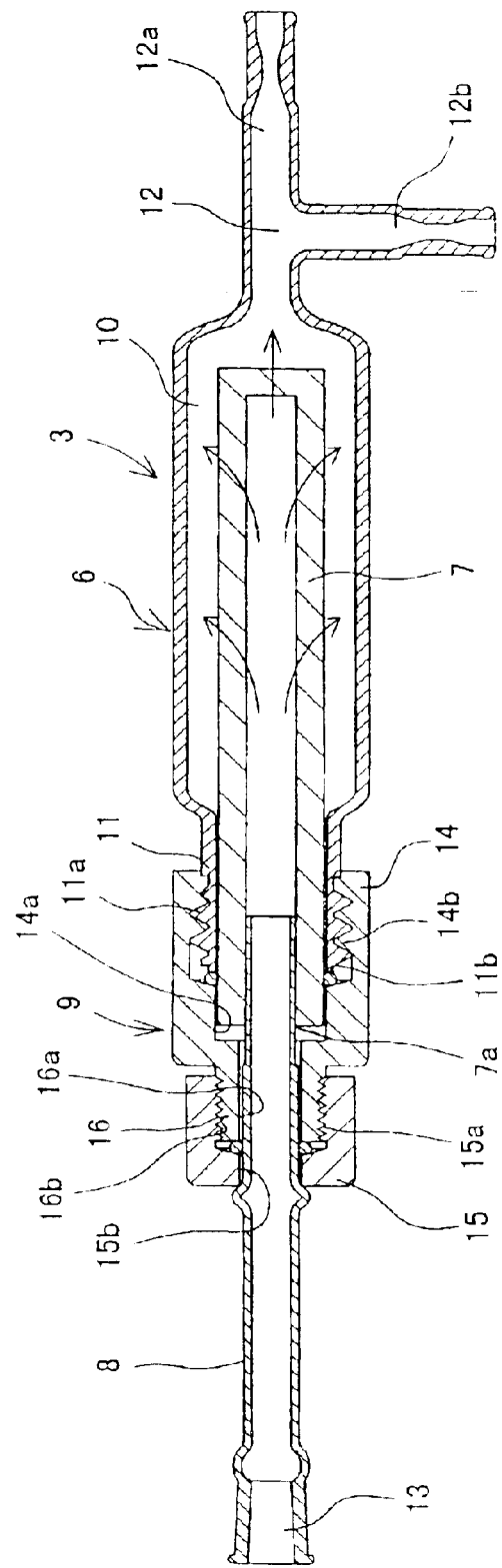
FIG. 3 is a vertical cross-sectional figure of the collector.
Figure 4:
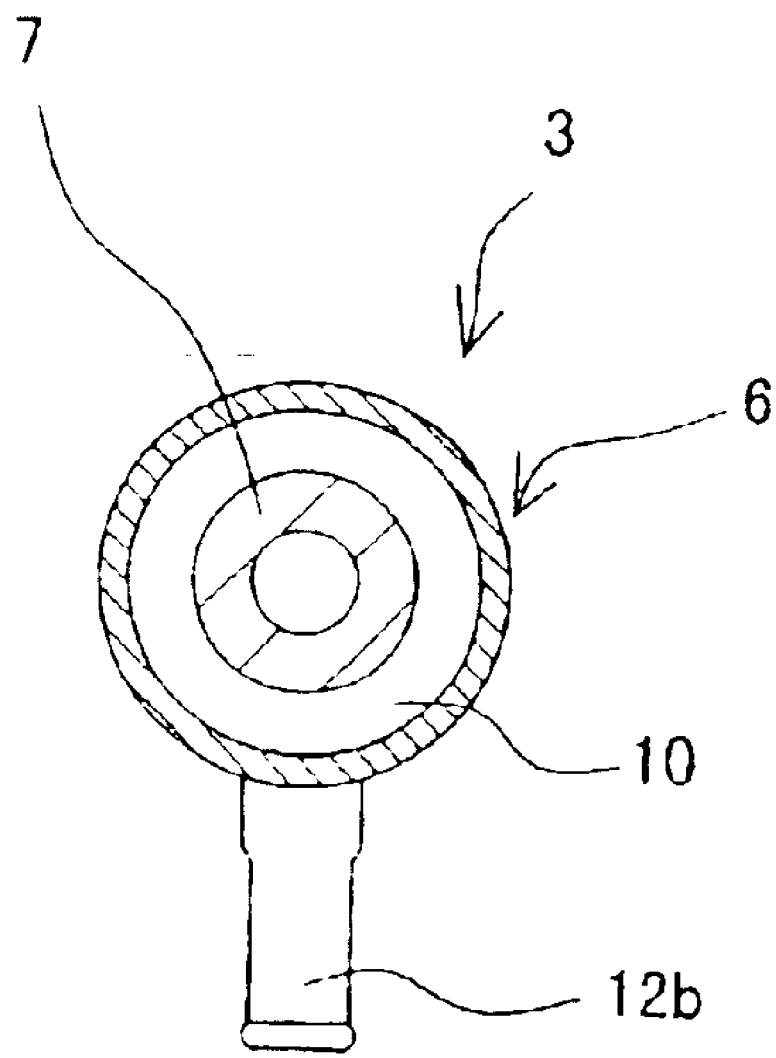
FIG. 4 is a IV—IV cross-sectional figure of FIG. 2.

With reference to FIGS. 2, 3, and 4, the collector 3 will be described in details. In the Figs., the collector 3 is provided mainly with a holder (one example of a container) 6, a sampling filter 7 (one embodiment of a sampling filter for chlorinated organic compounds according to the invention) for collecting and sampling the chlorinated organic compounds contained in the sample gas and installed in the holder 6, an introduction pipe 8 (one example of a transportation pipe) for introducing the sample gas transported through the sampling pipe 2 into the sampling filter 7, and an installation unit 9 for installing the introduction pipe 8 in the holder 6.

The holder 6 is an approximately cylindrical container made of transparent glass and comprises mainly a main body unit 10 capable of housing the sampling filter 7 in, an installation section 11 for installing the installation unit 9, and a gas discharge section 12 for discharging the sample gas.

The installation section 11 is integrally formed in the end part of the main body unit 10 and its diameter is narrowed as compared with the main body unit 10. The installation section 11 has a spiral groove 11a formed in the outer circumferential face and an opening part 11b in an end part.

The gas discharge section 12 is integrally formed in the other end part of the main body unit 10 and comprises a discharge route (one example of a discharge outlet) 12a for discharging the sample gas to the outside and a branch route 12b. The branch route 12b is for inserting a temperature measuring apparatus 27 (FIG. 1) such as a thermometer and a thermocouple for measuring the temperature of the sample gas passing through the gas discharge section 12 into the gas discharge section 12.

The sampling filter 7 is a cylindrical porous molded body closed in one end and having an opening part 7a for introducing the sample gas in the other end, in other words, a porous cylindrical filter and the opening part 7a side is supported by the installation unit 9, whereas the closed end side is inserted into the main body unit 10 of the holder 6 from the opening part 11b. The sampling filter 7 is not necessarily restricted in the size, however generally it is so formed as to have 50 to 150 mm in the length, 12 to 36 mm in the outer diameter of the end part in the opening part 7a side, 10 to 30 mm in the outer diameter of the closed end side, 1 to 10 mm in the thickness and is so tapered as to have an outer diameter in the closed end side narrower than the outer diameter of the end part in the opening part 7a side. Incidentally, the details of the sampling filter 7 will be further described later.

The introduction pipe 8 is a tubular member made of glass as same as the holder 6 and made detachable to the opening part 7a of the sampling filter 7. That is, the introduction pipe 8 has a joining part 13 for joining the end part of the sampling pipe 2 in one end and is inserted into the opening part 7a of the sampling filter 7 while penetrating the installation unit 9 in the other end in a detachable manner.

The installation unit 9 comprises a first supporting unit 14 for supporting the sampling filter 7 in the holder 6 and a second supporting unit 15 for installing the introduction pipe 8 in the first supporting unit 14. The first supporting unit 14 is made of a resin or a metal and has a hole part 14a for supporting the end part of the opening part 7a side of the sampling filter 7. In the inner circumferential face of the hole part 14a, a spiral groove 14b is formed. The first supporting unit 14 is fixed in the spiral groove 11a of the installation section 11 side of the holder 6 by screwing with the spiral groove 14b. Further, the first supporting unit 14 has a projected unit 16 projected in the left direction in FIG. 3. The projected unit 16 has a through hole 16a to enable the tip end of the introduction pipe 8 to be inserted into and a spiral groove 16b in the outer circumferential face.

On the other hand, the second supporting unit 15, a unit made of a resin or a metal as same as the first supporting unit 14, is formed to be like a cover having a spiral groove 16a in the inner circumferential face and has a through hole 15b to insert the introduction pipe 8 into. The second supporting unit 15 is fixed in the spiral groove 16b of the projected unit 16 of the first supporting unit 14 by screwing with the spiral groove 15a while the introduction pipe 8 being inserted into the through hole 15b.

The sampling filter 7 installed in such a collector 3 can be detached from the holder 6. In this case, the second supporting unit 15 of the installation unit 9 is detached from the first supporting unit 14 and the introduction pipe 8 is pulled out the sampling filter 7. When the first supporting unit 14 is detached from the holder 6, the sampling filter 7 can be taken out of the holder 6 while being supported by the first supporting unit 14.

The aspirator 4 is provided with a gas discharge route 20 and a suction apparatus 21. The gas discharge route 20 is joined to the discharge route 12a of the collector 3 using a tubular joint 22 in one end and has a cooling apparatus 23 and a trap 24 in this order from the collector 3 side. The suction apparatus 21 is attached to the other end of the gas discharge route 20 and comprises a suction pump 21a and a gas meter 21b in this order. The suction pump 21a has a flow rate adjusting function and is possible to be used continuously for 24 hours or longer. The gas meter 21b is for measuring the flow rate of the sample gas and is capable of measuring the flow rate in a range of 10 to 40 l/min with accuracy of 0.1 l/min level.

Next, the sampling filter 7 to be employed for the above-described collector 3 will be described in details. The sampling filter 7 is of a molded body having a three-dimensional mesh structure and a fluid-permeability (in this example, a gas-permeability).

The molded body composing the sampling filter 7 contains fibers (a group of fibers) and an inorganic binder. The fibers to be employed in this case are those which do not substantially cause chemical reactions with the various types of the chlorinated organic compounds such as dioxins, their precursor, and coplanar PCBs. Examples of the fibers include fibrous activated carbon, carbon fiber, glass fiber, alumina fiber (especially activated alumina fiber), silica fiber, and Teflon fiber. These fibers may be used solely or in combination of two or more types of them. The fiber diameter and the specific surface area of the fibers are not particularly restricted.

Incidentally, the average aspect ratio (the length/the diameter) of the fibers may 10,000 or lower, especially preferably 1,000 to 10,000. If the average aspect ratio of the fibers exceeds 10,000, the pressure loss increases during the time of sampling a sample fluid (a sample gas) to possibly result in incapability of isokinetic suction standardized according to the above-described JIS standards (JIS K 0311:1999).

On the other hand, the inorganic binder contained in the molded body has a property for binding the fibers to one another to integrate a group of the fibers and give a prescribed molding shape to the group of fibers, that is, has a function as a binder for maintaining the prescribed molding shape of the group of fibers. To say more practically in this embodiment, it is for setting the group of fibers to be the shape of said sampling filter 7, in other word, a cylindrical shape with closed one end.

An inorganic binder usable in this case is not particularly restricted if it has said properties and does not substantially cause chemical reactions with the fibers as well as chlorinated organic compounds, however those having an adsorbing capability, especially a chlorinated organic compounds-adsorbing capability are preferable. As such a inorganic binder having adsorbing capability, examples are alumina (especially, activated alumina), zeolites, silicon dioxide (silica), acidic white clay, apatites and the like. The respective inorganic binders may be used solely or in combination of two or more of them. Further, although the form of the inorganic binders is not specifically restricted, generally, those with a granular shape are used.

In this case, the zeolites are hydrated aluminosilicates having a general formula, $X_m Y_n O_{2n} \cdot sH_2O$, and in the general formula, the reference character X denotes Na, Ca or K; the reference character Y denotes Si+Al, respectively; and the reference character S is not constant. As such zeolites, synthetic zeolites are preferable to be used.

Among said inorganic binders, in this invention, those having a tar-adsorbing capability are especially preferable. If inorganic binders having such characteristics are used, the sampling filter 7 can effectively adsorb tar (details of it will be described later), for example, produced and derived from carbon monoxide contained in the sample gas and accordingly reliably collect and sample the various types of the chlorinated organic compounds such as dioxins and coplanar PCBs dissolved in the tar. Incidentally, examples of the inorganic binders capable of adsorbing tar include alumina, zeolites and silicon dioxide. As the alumina, activated alumina is especially preferable to be used. These inorganic binders capable of adsorbing tar may be used solely or in combination of two or more of them.

The molded body containing the above-described fibers and inorganic binder is preferable to have a bulk density preferably set to be 0.1 to 1 $g/cm^3$, more preferably 0.3 to 0.7 $g/cm^3$. If the bulk density of molded body is below 0.1 $g/cm^3$, some of chlorinated organic compounds contained in the sample gas are sometimes passed through the sampling filter 7 and that makes it difficult to carry out sampling of chlorinated organic compounds contained in the sampling gas without substantial leakage. Contrary, if the bulk density exceeds 1 $g/cm^3$, the pressure loss is probably increased in the sampling filter 7 at the time of collecting the particulate substances contained in the sampling gas to possibly result in incapability of isokinetic suction standardized according to said JIS standards (JIS K 0311:1999). Further, in the extraction operation, which will be described later, for extracting the chlorinated organic compounds sampled by the sampling filter 7, the extraction ratio is possibly decreased.

The preferable molded body composing the sampling filter 7 is those comprising activated alumina fibers as the fibers and a granular activated alumina as the inorganic binder. Especially, the most preferable one is such a molded body so formed as to have the bulk density in a range of 0.3 to 0.7 $g/cm^3$.

The sampling filter 7 of the above-described molded body can be produced, for example, by the following manner. At first, a molding material containing the above-described fibers and inorganic binder is prepared. In this case, a dispersion containing an inorganic binder dispersed in water is produced and the fibers are added to the dispersion and the inorganic binder and the fibers are evenly mixed. At that time, the mixing ratio of the fibers and the inorganic binder is preferable to be adjusted properly so as to keep the bulk density of the aimed molded body within said range.

Next, the obtained molding material is molded in a prescribed shape, that is, a one end-closed cylindrical shape to obtain a molded body. As the molding method employed in this case, a variety of well known molding methods, for example, a wet die molding method and the like may be employed. Then, the obtained molded body is sintered by heating to obtain the aiming molded body, that is, a sampling filter 7. The temperature at the time of sintering is not specifically restricted, however, in the case alumina is used for either one or both of the fibers and the inorganic binder, the temperature is preferable to be set in a range in which the alumina is activated and converted into activated alumina, that is, practically 150 to 700° C.

The molded body produced in the manner as described above may further be immersed in an aqueous dispersion containing an inorganic binder dispersed in water and then dried. If such treatment is carried out for the molded body, the molded body is impregnated with the inorganic binder and a molded body containing the inorganic binder in a larger amount can be produced. Further, by way of such treatment, the bulk density of the molded body can be adjusted to be within said preferable range. Since the inorganic binder is consequently contained in a large quantity by such treatment, in the case of using an inorganic binder having said tar-adsorbing capability, the chlorinated organic compounds contained in the sample gas can be collected without, leakage even if a large quantity of unburned hydrocarbons, which will be described later, and carbon monoxide are contained in the sample gas. Incidentally, the drying method for the molded body is not particularly restricted, generally, it is preferable to employ a method for removing water by heating the molded body at 150 to 700° C.

Next, a use method of the sampling apparatus 1, that is, a sampling method of chlorinated organic compounds using the sampling apparatus 1 will be described. In this embodiment, the description will be regarding a case of sampling a sample gas from a waste gas flowing in a space in incineration facilities for incinerating wastes, for example, flowing in a flue duct and sampling the various types of the chlorinated organic compounds such as dioxins and coplanar PCBs. In this case, as shown in FIG. 1, the tip end of the sampling pipe 2 of the sampling apparatus 1 is inserted into a flue duct 25 from a sampling port 25a formed in the flue duct 25. At that time, a packing 26 is attached to the sampling pipe 2 to air-tightly seal the gap between the sampling pipe 2 and the sampling port 25a. Further, a temperature measuring apparatus 27 such as a thermometer and a thermocouple is installed in the branch route 12b in the collector 3.

In such a state, the suction pump 21a is operated to carry out isokinetic suction of some of the waste gas flowing in the flue duct 25 into the sampling pipe 2. At that time, the isokinetic suction amount is calculated by measuring the temperature, the flow rate, the pressure, and the water amount in the waste gas flowing in the flue duct 25 according to JIS Z 8808 and based on the calculation results, the suction flow rate by the suction pump 21a is controlled. The flow rate set in this case is preferable to be properly monitored by a gas meter 21b and properly adjusted as to continuously keep the isokinetic suction state.

The sampled gas flowing into the sampling pipe 2 is cooled by the cooling apparatus 5 and generally cooled to the temperature not higher than the dioxins production temperature, for example, to 120° C. or lower. Consequently, generation of new dioxins can be prevented in the sampling pipe 2.

The cooled sampled gas then flows into the sampling filter 7 after passing through the introduction pipe 8 of the collector 3 from the sampling pipe 2. The sampled gas flowing into the sampling filter 7 flows out to the main body unit 10 of the holder 6 after passing through the sampling filter 7 as shown by the arrow in FIG. 3 and flows toward an aspirator 4 after passing through the discharge route 12a. At that time, a various soot and dust and various types of the chlorinated organic compounds such as dioxins and coplanar PCBs in both particulate and gaseous forms and contained in the sampled gas are simultaneously collected by said fibers and the inorganic binder and sampled from the sampled gas.

In the case a large quantity of carbon compounds such as unburned hydrocarbons and carbon monoxide (CO) are contained in the sampled gas, tar derived from the carbon compounds is easy to be produced in the sampled gas. In many cases, the tar dissolves the various types of the chlorinated organic compounds such as dioxins and coplanar PCBs therein and takes them inside. For that, if a filter employing an inorganic binder having no tar-adsorbing capability, for example, a filter made of a molded body produced by molding the above-described fibers using an organic binder such as a cellulose type binder is employed as the sampling filter 7, the filter cannot efficiently collect the tar produced in the sampled gas and consequently, some of tar contained in the sampled gas possibly passes through the filter and leaks to the outside. That is, the chlorinated organic compounds dissolved in the tar are possibly discharged to the outside together with some of the tar without being sampled by the filter. That is a phenomenon which inventors of the present invention have found in the process of developing the invention and if the amount of the unburned hydrocarbons is judged using carbon monoxide as an index, especially, in the case the carbon monoxide concentration in the sampled gas exceeds 150 ppm, it is found that tar considerably passes through.

On the contrary, the sampling filter 7 according to this embodiment, in the case the filter is made of a molded body containing the above-described fibers and an inorganic binder having tar-adsorbing capability, can collect tar contained in a sampled gas substantially without leakage even if the concentration of the unburned carbon compounds in the sampled gas is high (for example, even in the case the concentration of carbon monoxide in the sampled gas exceeds 150 ppm). In other words, the sampling filter 7 can collect and sample the various types of the chlorinated organic compounds such as dioxins and coplanar PCBs in both particulate and gaseous forms contained in the sampled gas substantially without leakage, regardless of the degree of the concentration of the unburned hydrocarbons in the sampled gas.

As described above, the sampled gas from which soot and dust and the various types of the chlorinated organic compounds in particulate and gaseous forms are removed by the sampling filter 7 substantially without leakage continuously flows toward the aspirator 4 from the discharge route 12a. At that time, the temperature of the sampled gas flowing in the discharge route 12a is measured by the temperature measuring apparatus 27 installed in the branch route 12b and controlled.

The sampled gas discharged out the discharge route 12a flows in the gas discharge route 20 and further cooled by the cooling apparatus 23. Consequently, water contained in the sampled gas is condensed and stored in the trap 24. The sampled gas from which water is removed in such a manner is discharged to the outside from the gas meter 21b after passing through the suction pump 21a. Incidentally, sampling of a sample gas, that is a waste gas, by the sampling apparatus 1 is carried out generally for a duration corresponding to the waste gas amount estimated from the detection limit value of the chlorinated organic compounds (generally, a waste gas of 1 to 3 $Nm^3$/3 to 4 hours).

In the case of analysis of the concentration of the chlorinated organic compounds contained in the gas (a waste gas) sampled in such a manner, the sampling apparatus 1 is detached from the flue duct 25 and the collector 3 is isolated from the sampling apparatus 1. Further, the sampling filter 7 is detached from the isolated collector 3.

Then, the sampling pipe 2, the introduction pipe 8, and the holder 6 are washed using a solvent and the washing liquid at that time is kept. On the other hand, the chlorinated organic compounds collected by the sampling filter 7 of the collector 3 are extracted by a solvent. In this case, the extraction operation of the chlorinated organic compounds collected by the sampling filter 7 can be carried out by, for example, a common Soxhlet extractor. However the sampling filter 7 can be housed in a cell of a high speed extractor if it is set in a small size as described above and using the high speed extractor, the extraction operation can quickly be carried out. Further, the sampling filter 7 does not require the extraction conditions to be set specially in order to shorten the extraction time if the bulk density of the molded body composing the filter is set within the said range and the collected chlorinated organic compounds can be dissolved in the solvent quickly within a short time.

At the time of analysis of the chlorinated organic compounds, the above-described washing liquid and the extraction solution obtained by the extraction operation as described above are mixed and subjected to the analysis operation. In this case, as the analysis method, for example, methods employing gas chromatographic mass spectroscopy (GC/MS method) may be employed according to a method disclosed in, "Standard measurement and analysis manual for dioxins in waste treatment" edited by Environment assessment section, City water environment division, Life hygiene bureau of the Ministry of Health and Welfare Japan (published in March 1997, by Foundation of Waste Research and Investigation) or a method standardized by Japanese Industrial Standards JIS K 0311: 1999 (formulated on Sep. 20, 1999).

In the case another sample gas is sampled using the sampling apparatus 1, for example, the collector 3 is replaced with a new one. In this case, since the sampling apparatus 1 can be employed for the next gas sampling by sufficiently washing only the sampling pipe 2, the preparatory work before sampling a sample gas is significantly made easy as compared with that carried out using a conventional impinger and the time taken to sample the sample gas can considerably be shortened and the cost for sampling the sample gas can greatly be lowered. Further, since the sampling apparatus 1, especially the collector 3, is simple in the constitution as compared with a conventional complicated sampling apparatus, so that it is easy to handle and transport. For that, using the sampling apparatus 1, a sampling work of a sample gas can be carried out easily even in a flue duct where it is difficult to install a conventional large size sampling apparatus using an impinger.

Incidentally, the collector 3 used once can be re-used repeatedly by sufficiently washing the holder 6 and the introduction pipe 8 and replacing the sampling filter 7 with a new one.

The invention can be modified as follows.
(1) Although a cylindrical filter is used as the sampling filter 7 in the above-described embodiment, the invention is not restricted to that. For example, the invention can be carried out in the same manner in the case the sampling filter 7 is formed into a column-like or a disk-like shape.
(2) Although in the above-described embodiment, description is given regarding the case of sampling the chlorinated organic compounds such as dioxins and coplanar PCBs contained in a waste gas (a sample gas) discharged out an incinerator of wastes, the sampling filter, the sampling apparatus, and the sampling method of the invention may be employed in the same manner also in the case of sampling the chlorinated organic compounds contained in a fluid other than the waste gas. For example, the sampling filter and the like of the invention may be used in the same manner in the case of sampling the chlorinated organic compounds contained in the atmospheric air and the chlorinated organic compounds contained in water such as industrial wastewater, seawater, freshwater, and tap water and the like.

Incidentally, in the case of sampling the chlorinated organic compounds contained in water such as industrial water, the target sample is a liquid sample. In this case, the liquid sample possibly contains various types of the chlorinated organic compounds in particulate state, foam state (that is, gas-liquid mixed state), and dissolved state (that is, dissolved-in-water state), the sampling filter of the invention can simultaneously collect the various types of the chlorinated organic compounds in a variety of such states and sample them from the liquid sample.

Hereinafter, the invention will be described in greater detail according to the examples. Here, for the sake of understanding, at first comparative examples will be described and then examples will be described.

Comparative Example 1

Coal based fibrous activated carbon with the average fiber diameter of 4 $\mu$m in 5% by weight and carbon fiber with the average fiber diameter of 13 $\mu$m in 95% by weight were mixed and a cellulose-based binder was added to obtain a molding material. The obtained molding material was molded into a one end-closed cylindrical shape and the resulting molded body was heated to dry the cellulose-based binder. Consequently, a cylindrical molded body (a sampling filter) having the weight of 2.3 g and the bulk density of 0.11 g/cm$^3$ was obtained which was so adjusted as to have the outer diameter of 19 mm in the opening end side, the outer diameter of 18 mm in the closed end side, the thickness of 5 mm, and the length of 20 mm, respectively.

Using the obtained sampling filter, a collector 3 for the chlorinated organic compounds according to the above-described embodiment was produced. Using the collector 3, the sampling apparatus 1 according to the above-described embodiment was produced. A sample gas (a waste gas) was sampled from a flue duct of an incinerator during incineration of wastes using the sampling apparatus 1 to sample the various types of the chlorinated organic compounds such as dioxins and coplanar PCBs contained in the sample gas. The sampling conditions of the sample gas were adjusted as the conditions standardized by the JIS K 0311: 1999.

Simultaneously, the sample gas (the waste gas) was sampled from the same flue duct in the same conditions using a sample gas sampling apparatus equipped with an impinger (hereinafter referred as to an apparatus exemplified in JIS formulation) to sample the various types of the chlorinated organic compounds such as dioxins and the coplanar PCBs contained in the sample gas.

The sampled chlorinated organic compounds were extracted by the method according to JIS K 0311: 1999 and quantitatively analyzed according to the analysis method standardized in the same JIS standards. As a result, in the case the average concentration of carbon monoxide in the sample gas was 150 ppm or lower, the amount of the chlorinated organic compounds sampled by the sampling apparatus employing the sampling filter of this comparative example was found different from the amount of the chlorinated organic compounds sampled by the apparatus exemplified in JIS formulation by 3% but substantially same as that sampled by the apparatus exemplified in JIS formulation. On the other hand, in the case the average concentration of carbon monoxide in the sample gas was 510 ppm, the amount of the chlorinated organic compounds sampled by the sampling apparatus employing the sampling filter of this comparative example was found only 85% to the amount of the chlorinated organic compounds sampled by the apparatus exemplified in JIS formulation. Consequently, if the carbon monoxide concentration in the sample gas increased, in other words, if the concentration of unburned carbon compounds increased in the sample gas, the sampling filter of the comparative example was found difficult to collect some of chlorinated organic compounds contained in the sample gas.

Comparative Example 2

Coal based fibrous activated carbon with the average fiber diameter of 4 $\mu$m in 5% by weight, carbon fiber with the average fiber diameter of 13 $\mu$m in 65% by weight, and glass fiber with the average fiber diameter of 3 $\mu$m in 30% by weight were mixed and a cellulose-based binder was added to obtain a molding material. The obtained molding material was molded into a one end-closed cylindrical shape and the resulting molded body was heated to dry the cellulose-based binder. Consequently, a cylindrical molded body (a sampling filter) having the weight of 2.5 g and the bulk density of 0.13 g/cm$^3$ was obtained which was so adjusted as to have the same sizes as those of Comparative example 1.

Using the obtained sampling filter, the chlorinated organic compounds contained in a sample gas sampled from the flue duct in the same manner as Comparative example 1 were sampled and the results of their quantitative analysis were compared with those obtained in the case of sampling by the apparatus exemplified in JIS formulation. In the case the average concentration of carbon monoxide in the sample gas was 150 ppm or lower, the amount of the chlorinated organic compounds sampled by the sampling apparatus employing the sampling filter of this comparative example was found different from the amount of the chlorinated organic compounds sampled by the apparatus exemplified in JIS formulation by 3% but substantially same as that sampled by the apparatus exemplified in JIS formulation. On the other hand, in the case the average concentration of carbon monoxide in the sample gas was 550 ppm, the amount of the chlorinated organic compounds sampled by the sampling apparatus employing the sampling filter of this comparative example was found only 82% to the amount of the chlorinated organic compounds sampled by the apparatus exemplified in JIS formulation. Consequently, if the carbon monoxide concentration in the sample gas increased, in other words, if the concentration of unburned carbon compounds increased in the sample gas, the sampling filter of the comparative example was found difficult to collect some of chlorinated organic compounds contained in the sample gas.

EXAMPLE 1

An aqueous alumina dispersion containing about 20% by weight of granular alumina (an inorganic binder) was prepared and alumina fibers (containing 72% by weight of γ-alumina and 28% by weight of silica) having an average fiber diameter of 6 $\mu$m and an average aspect ratio of 2,000 as fibers were added to the alumina dispersion and mixed well. The obtained molding material was molded in a one end-closed cylindrical shape and sintered at 200° C. Consequently, a cylindrical molded body (a sampling filter) having the weight of 8.5 g and the bulk density of 0.38 g/cm$^3$ was obtained which was so adjusted as to have the same sizes as those of Comparative example 1. Incidentally, the glass fibers and the granular alumina contained in the molded body were 5.7 g and 2.8 g, respectively.

Figure 5:
FIG. 5 is an electron microscopic photograph of a part of the molded body obtained in Example 1.

The electron microscopic photograph of a part of the obtained molded body is shown in FIG. 5. From FIG. 5, the molded body was found having a gas-permeability and fine mesh structure (three-dimensional mesh structure) in which alumina fibers were bound to one another by the granular alumina, which is the inorganic binder.

Using the obtained sampling filter, the chlorinated organic compounds contained in a sample gas sampled from the flue duct in the same manner as Comparative example 1 were sampled and the results of their quantitative analysis were compared with those obtained in the case of sampling by the apparatus exemplified in JIS formulation. In both cases the average concentration of carbon monoxide in the sample gas was 150 ppm or lower and the concentration was 650 ppm, the amount of the chlorinated organic compounds sampled by the sampling apparatus employing the sampling filter of this example was found different from the amount of the chlorinated organic compounds sampled by the apparatus exemplified in JIS formulation by 1% but substantially same as that sampled by the apparatus exemplified in JIS formulation. Consequently, regardless of the carbon monoxide concentration in the sample gas, in other words, regardless of the concentration of unburned carbon compounds in the sample gas, the sampling filter of this Example 1 was found capable of collecting various types of the chlorinated organic compounds in both particulate and gaseous forms contained in the sample gas substantially similarly to the apparatus exemplified in JIS formulation.

EXAMPLE 2

A cylindrical molded body (a sampling filter) having a gas-permeability and the same sizes as those of Example 1 was obtained by the same operation as that in the case of Example 1, except that alumina fibers (containing at least 95% by weight of γ-alumina) having an average fiber diameter of 5 $\mu$m and an average aspect ratio of 2,400 as fibers were used. The molded body had a weight of 7.9 g and the bulk density of 0.32 g/cm$^3$ and the alumina fibers and the granular alumina contained in the molded body were 5.3 g and 2.6 g, respectively.

Using the obtained sampling filter, the chlorinated organic compounds contained in a sample gas sampled from the flue duct in the same manner as Comparative example 1 were sampled and the results of their quantitative analysis were compared with those obtained in the case of sampling by the apparatus exemplified in JIS formulation. In both cases the average concentration of carbon monoxide in the sample gas was 150 ppm or lower and the concentration was 650 ppm, the amount of the chlorinated organic compounds sampled by the sampling apparatus employing the sampling filter of this example was found different from the amount of the chlorinated organic compounds sampled by the apparatus exemplified in JIS formulation by 1% but substantially same as that sampled by the apparatus exemplified in JIS formulation. Consequently, regardless of the carbon monoxide concentration in the sample gas, in other words, regardless of the concentration of unburned carbon compounds in the sample gas, the sampling filter of this Example 2 was found capable of sampling various types of the chlorinated organic compounds in both particulate and gaseous forms contained in the sample gas substantially similarly to the apparatus exemplified in JIS formulation.

EXAMPLE 3

A molded body obtained in Example 1 was further immersed in an aqueous dispersion containing 20% by weight of granular alumina dispersed and then taken out and dried by heating at 200° C. Consequently, a molded body (a sampling filter) having a weight of 12.8 g and the bulk density of 0.6 g/cm$^3$ was obtained.

Using the obtained sampling filter, the chlorinated organic compounds contained in a sample gas sampled from the flue duct in the same manner as Comparative example 1 were sampled and the results of their quantitative analysis were compared with those obtained in the case of sampling by the apparatus exemplified in JIS formulation. In both cases the average concentration of carbon monoxide in the sample gas was 150 ppm or lower and the concentration was 750 ppm, the amount of the chlorinated organic compounds sampled by the sampling apparatus employing the sampling filter of this example was found different from the amount of the chlorinated organic compounds sampled by the apparatus exemplified in JIS formulation by 1% but substantially same as that sampled by the apparatus exemplified in JIS formulation. Consequently, regardless of the carbon monoxide concentration in the sample gas, in other words, regardless of the concentration of unburned carbon compounds in the sample gas, the sampling filter of this Example 3 was found capable of sampling various types of the chlorinated organic compounds in both particulate and gaseous forms contained in the sample gas substantially similarly to the apparatus exemplified in JIS formulation.

EXAMPLE 4

A molded body obtained in Example 2 was further immersed in an aqueous dispersion containing 20% by weight of granular alumina dispersed and then taken out and dried by heating at 300° C. Consequently, a molded body (a sampling filter) having a weight of 12.3 g and the bulk density of 0.58 g/cm$^3$ was obtained.

Using the obtained sampling filter, the chlorinated organic compounds contained in a sample gas sampled from the flue duct in the same manner as Comparative example 1 were sampled and the results of their quantitative analysis were compared with those obtained in the case of sampling by the apparatus exemplified in JIS formulation. In both cases the average concentration of carbon monoxide in the sample gas was 150 ppm or lower and the concentration was 700 ppm, the amount of the chlorinated organic compounds sampled by the sampling apparatus employing the sampling filter of this example was found different from the amount of the chlorinated organic compounds sampled by the apparatus exemplified in JIS formulation by 1% but substantially same as that sampled by the apparatus exemplified in JIS formulation. Consequently, regardless of the carbon monoxide concentration in the sample gas, in other words, regardless of the concentration of unburned carbon compounds in the sample gas, the sampling filter of this Example 4 was found capable of sampling various types of the chlorinated organic compounds in both particulate and gaseous forms contained in the sample gas substantially similarly to the apparatus exemplified in JIS formulation.

EXAMPLE 5

A cylindrical molded body having a gas-permeability and the same sizes as those of Example 1 was obtained by the same operation as that in the case of Example 1, except that glass fibers having an average fiber diameter of 4 $\mu$m and an average aspect ratio of 3,000 as fibers were used. The molded body had a weight of 8.8 g and the bulk density of 0.37 g/cm$^3$ and the glass fibers and the granular alumina contained in the molded body were 6.1 g and 2.7 g, respectively.

The obtained molded body was further immersed in an aqueous dispersion containing 20% by weight of granular alumina dispersed and then taken out and dried by heating at 400° C. Consequently, a molded body (a sampling filter) having a weight of 12.9 g and the bulk density of 0.62 g/cm³ was obtained.

Using the obtained sampling filter, the chlorinated organic compounds contained in a sample gas sampled from the flue duct in the same manner as Comparative example 1 were sampled and the results of their quantitative analysis were compared with those obtained in the case of sampling by the apparatus exemplified in JIS formulation. In both cases the average concentration of carbon monoxide in the sample gas was 150 ppm or lower and the concentration was 550 ppm, the amount of the chlorinated organic compounds sampled by the sampling apparatus employing the sampling filter of this example was found different from the amount of the chlorinated organic compounds sampled by the apparatus exemplified in JIS formulation by 1% but substantially same as that sampled by the apparatus exemplified in JIS formulation. Consequently, regardless of the carbon monoxide concentration in the sample gas, in other words, regardless of the concentration of unburned carbon compounds in the sample gas, the sampling filter of this Example 5 was found capable of sampling various types of the chlorinated organic compounds in both particulate and gaseous forms contained in the sample gas substantially similarly to the apparatus exemplified in JIS formulation.

EXAMPLE 6

A cylindrical molded body having a gas-permeability and the same sizes as those of Example 1 was obtained by the same operation as that in the case of Example 1, except that silica fibers having an average fiber diameter of 7 μm and an average aspect ratio of 1,500 as fibers were used. The molded body had a weight of 7.2 g and the bulk density of 0.31 g/cm³ and the silica fibers and the granular alumina contained in the molded body were 4.7 g and 2.5 g, respectively.

The obtained molded body was further immersed in an aqueous dispersion containing 20% by weight of granular alumina dispersed and then taken out and dried by heating at 550° C. Consequently, a molded body (a sampling filter) having a weight of 11.3 g and the bulk density of 0.58 g/cm³ was obtained.

Using the obtained sampling filter, the chlorinated organic compounds contained in a sample gas sampled from the flue duct in the same manner as Comparative example 1 were sampled and the results of their quantitative analysis were compared with those obtained in the case of sampling by the apparatus exemplified in JIS formulation. In both cases the average concentration of carbon monoxide in the sample gas was 150 ppm or lower and the concentration was 500 ppm, the amount of the chlorinated organic compounds sampled by the sampling apparatus employing the sampling filter of this example was found different from the amount of the chlorinated organic compounds sampled by the apparatus exemplified in JIS formulation by 1% but substantially same as that sampled by the apparatus exemplified in JIS formulation. Consequently, regardless of the carbon monoxide concentration in the sample gas, in other words, regardless of the concentration of unburned carbon compounds in the sample gas, the sampling filter of this Example 6 was found capable of sampling various types of the chlorinated organic compounds in both particulate and gaseous forms contained in the sample gas substantially similarly to the apparatus exemplified in JIS formulation.

The present invention can be carried out in variously modified forms without departing from the true scope and the features of the invention. The above-described examples and embodiments are merely examples and are not meant to be construed in a limiting sense. It is therefore contemplated that the appended claims will cover any modifications or embodiments as fall within the true scope of the invention.

What is claimed is:

1. A method for sampling chlorinated organic compounds contained in a fluid flowing in a transportation pipe, comprising passing the fluid from the transportation pipe through a filter of a fluid-permeable molded body having an opening and containing fibers and an inorganic binder for binding the fibers to one another, wherein the transportation pipe is inserted into the opening.

2. A method for removing chlorinated organic compounds contained in a fluid flowing in a transportation pipe, comprising:

passing the fluid from the transportation pipe through a filter of a fluid-permeable molded body having an opening and containing fibers and an inorganic binder for binding the fibers to one another, wherein the transportation pipe is inserted into the opening.

3. A collector for collecting chlorinated organic compounds contained in a fluid flowing in a transportation pipe, comprising:

a filter of a fluid-permeable molded body for passing the fluid from the transportation pipe through and a container for housing the filter and having a discharge outlet for discharging the fluid passed through the filter to the outside, wherein the filter is a cylinder having an opening to insert the transportation pipe into one side and closed in the other side and comprises fibers and an inorganic binder for binding the fibers to one another, wherein the inorganic binder has a chlorinated organic compounds-adsorbing capability.

4. The collector of claim 3, wherein the inorganic binder is at least one compound selected from the group consisting of alumina, zeolite and silicon dioxide.

5. The collector of claim 3, wherein the fibers are activated alumina fibers and the inorganic binder is a granular activated alumina.

6. The collector of claim 5, wherein the filter has a bulk density of 0.3 to 0.7 g/cm³.

* * * * *

UNITED STATES PATENT AND TRADEMARK OFFICE
CERTIFICATE OF CORRECTION

PATENT NO.        : 6,890,374 B2
APPLICATION NO.   : 10/048526
DATED             : May 10, 2005
INVENTOR(S)       : Katsuhisa Honda et al.

It is certified that error appears in the above-identified patent and that said Letters Patent is hereby corrected as shown below:

On the Title Page and Column 1 line 1 of the patent, please change item (54) (the Title) as follows:

"SAMPLING FILTER FOR CHLORINATED ORGANIC COMPOUND"

to:

-- SAMPLING FILTER FOR CHLORINATED ORGANIC COMPOUNDS --

Signed and Sealed this

Twenty-sixth Day of June, 2007

JON W. DUDAS
*Director of the United States Patent and Trademark Office*